(12) United States Patent
Goldhamer

(10) Patent No.: US 11,576,154 B2
(45) Date of Patent: Feb. 7, 2023

(54) DISAGGREGATED RAN ARCHITECTURE FOR MOBILE EDGE COMPUTING

(71) Applicant: Mariana Goldhamer, Ramat Gan (IL)

(72) Inventor: Mariana Goldhamer, Ramat Gan (IL)

(*) Notice: Subject to any disclaimer, the term of this patent is extended or adjusted under 35 U.S.C. 154(b) by 0 days.

(21) Appl. No.: 17/730,386

(22) Filed: Apr. 27, 2022

(65) Prior Publication Data
US 2022/0256510 A1 Aug. 11, 2022

Related U.S. Application Data

(63) Continuation of application No. 16/818,389, filed on Mar. 13, 2020, now Pat. No. 11,350,388.

(60) Provisional application No. 62/967,725, filed on Jan. 30, 2020, provisional application No. 62/817,623, filed on Mar. 13, 2019.

(51) Int. Cl.
*H04W 72/04* (2009.01)
*H04W 76/14* (2018.01)
*H04W 4/40* (2018.01)
*H04W 16/14* (2009.01)

(52) U.S. Cl.
CPC ........... *H04W 72/04* (2013.01); *H04W 4/40* (2018.02); *H04W 16/14* (2013.01); *H04W 76/14* (2018.02)

(58) Field of Classification Search
CPC ... H04W 72/04; H04W 72/0406; H04W 4/40; H04W 4/70; H04W 16/14; H04W 16/26; H04W 76/14; H04W 88/085
See application file for complete search history.

(56) References Cited

U.S. PATENT DOCUMENTS

| | | | | |
|---|---|---|---|---|
| 2021/0099976 A1* | 4/2021 | Mueck | ........ | H04W 4/40 |
| 2022/0103614 A1* | 3/2022 | Ganguli | ........ | H04W 4/70 |
| 2022/0183089 A1* | 6/2022 | Walldeen | ........ | H04W 76/12 |
| 2022/0201777 A1* | 6/2022 | Teyeb | ........ | H04W 76/20 |

* cited by examiner

*Primary Examiner* — Farid Seyedvosoghi

(57) ABSTRACT

A Radio Access Network node implements a radio air interface for delivering communications with User Equipments (UEs).
The functions of the RAN node are split between a Central Unit (CU) and Distributed Units (DUs).
The CU is disaggregated into a CU-CP (CU-Control Plane) entity and into a first CU-UP (CU-User Plane) entity, both entities being connected to a core network, and into at least one second CU-UP entity, connected to the CU-CP entity and to at least one DU.
User data associated with a specific application is transferred between the specific application executed by one or more UEs and a specific application server hosted by a MEC platform, via a given second CU-UP entity, without passing through any core network entity or function.
In a claim, the air interface is a cellular base-station-to-device air interface or a cellular device-to-device air interface.

20 Claims, 8 Drawing Sheets

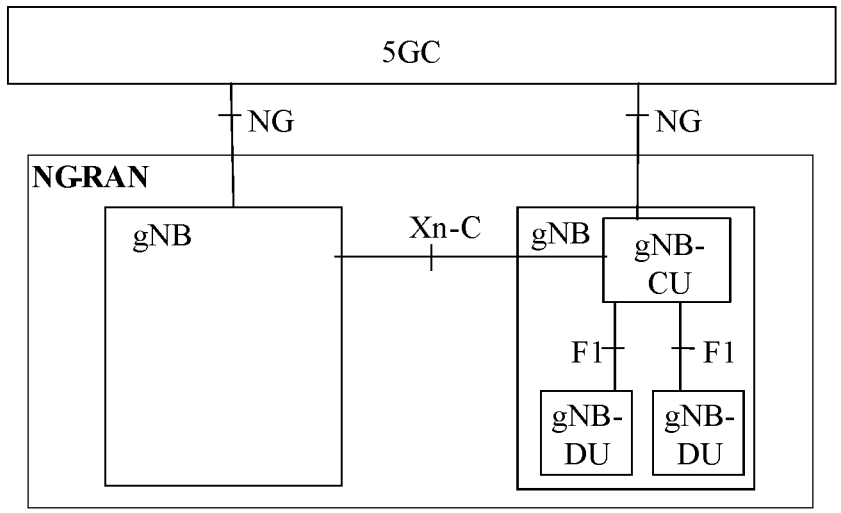
Fig. 1 Overall Architecture – prior art
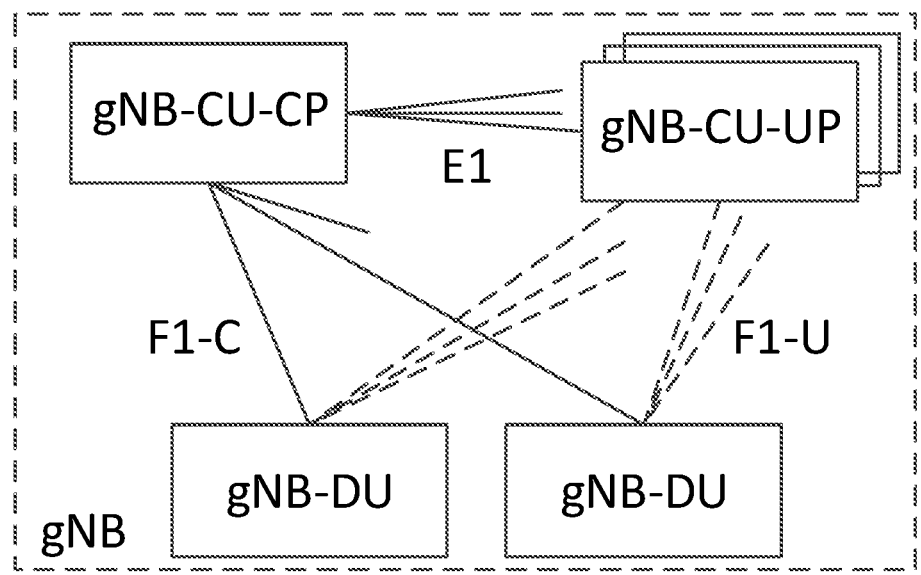
FIG. 2 (prior art) Separation of gNB-CU

DISAGGREGATED RAN ARCHITECTURE FOR MOBILE EDGE COMPUTING

CROSS-REFERENCE TO RELATED APPLICATIONS

This application claims priority from U.S. provisional patent application No. 62/817,623, entitled "RSU INTEGRATION IN CELLULAR ARCHITECTURE," filed on Mar. 13, 2019, and U.S. provisional patent application No. 62/967,725, entitled "RSU AND MEC INTEGRATION IN CELLULAR ARCHITECTURE", filed on Jan. 30, 2020, which are incorporated herein by reference in their entirety.

FIELD OF THE INVENTION

The invention relates generally to digital communication systems and in particular to cellular systems distributing information over radio to user equipment.

The list of abbreviations used in this document is provided at the end of this specification.

BACKGROUND OF THE INVENTION

The D2D (Device to Device) technology has evolved in 3GPP as a spin-off of the BS (Base Station)—UE (User Equipment) Uu interface. Later D2D was adapted for supporting V2X—Vehicle to Everything services. The names used in 3GPP to designate the D2D technology are sidelink (SL) and PC5, used in an interchangeable mode.

In 3GPP Release 16, which defines the NR (New Radio, aka 5G) technology to be used in V2X, the control of NR SL/PC5 radio resource allocation can be done through NR Uu radio interface, i.e. by the NR base station while using the over-the-air communication over the Uu interface with a UE including PC5/SL functionality.

The Uu solution for PC5/SL resource allocation makes sense for remote PC5 UEs in the absence of an RSU (Road Side Unit), which essentially is an infrastructure UE, in the same way as a base station is an infrastructure entity. The connection through Uu interface implies reduced radio efficiency, as a part of the Uu time-frequency resources in V2X communication will be reserved for receiving the control information from different base stations using different technologies over the air.

In practice, an NR base station will need to coordinate with an LTE base station regarding the allocation of radio (time-frequency) resources by the Uu links used by an RSU, leading to delays of resource assignment, delays which may be incompatible with the latency requirements for a number of use cases, including road safety and remote driving.

In many situations the information shared over PC5 needs to be also transmitted to an Application Server(s); the current solution is to use the Uu interface for relaying the information, resulting in a double spectrum use: once on PC5 and once on Uu.

Another aspect is related to the use of spectrum owned by Operators: the resource groups are allocated per Operator—PLMN (Public Land Mobile Network), while the participants in traffic belong to multiple Operators and the MEC (Mobile Edge Computing) platforms, necessary for advanced use cases, for example sensor fusion, may be operated by other entities.

Based on the 3GPP architecture, presented in 3GPP TS 23.287 Rel. 16, in "case of inter-PLMN V2X communication over PC5 reference point, the PC5 parameters need to be configured in a consistent way among the UEs within a certain region", but no solution is provided for making this concept usable.

SUMMARY OF THE INVENTION

The disclosure may be summarized by referring to the appended claims.

According to a first embodiment of the present invention, is defined a method for radio network operation, comprising:
  partitioning functions of a first user equipment (UE) used as a road-side unit (RSU) for providing V2X (Vehicle to Everything) services into a central unit (RSU-CU) and one or more distributed units (RSU-DUs);
  establishing over the air communications between the RSU and a second user equipment via at least one of the RSU-DUs using a device-to-device (D2D) cellular technology, while implementing at least a RRC (Radio Resource Control) protocol within the RSU-CU and implementing at least MAC (Medium Access Control) and at least a part of PHY (Physical Layer) radio layers within each of the RSU-DUs;
  selecting time-frequency resources for communication between the RSU and the second UE while using the D2D technology; and
  operating both the RSU-CU and the at least one of the RSU-DUs to perform radio communication with the second UE in accordance with the selected time-frequency resources and the implemented protocols and radio layers.

According to another embodiment, operating both the RSU-CU and the at least one of the RSU-DUs comprises forwarding user data packets by a Service Data Adaptation Protocol (SDAP) layer operating within the RSU-CU towards a distributed unit for transmission to the second UE.

According to yet another embodiment, operating the RSU-CU or the at least one of the RSU-DUs comprises operating a Packet Data Convergence Protocol (PDCP) sub-layer on the RSU-CU or on the RSU-DU at least for encrypting or decrypting the control information and/or the user data.

According to another embodiment, the RSU-CU connects to the Core network of the cellular system.

According to still another embodiment, the RSU appears to the Core Network as a Base Station.

According to an embodiment, partitioning the functions comprises separating the RSU-CU into a first entity implementing control plane functions and a second entity implementing user plane functions.

According to another embodiment, partitioning the functions comprises establishing a first control interface between the RSU-CU and each RSU-DU.

According to another embodiment, partitioning the functions comprises establishing a first control interface between the RSU-CU and each RSU-DU.

According to yet another embodiment, selecting the time-frequency resources comprises transmitting over the first control interface an indication of time-frequency resources for the at least one RSU-DU operation in a licensed spectrum or in an un-licensed spectrum.

According to another embodiment, a cellular base station is partitioned into a central unit and one or more distributed units and the RSU-CU functions are included within the central unit of the base station and the RSU-DU functions are included within the distributed unit of the base station, resulting one or more combined base station and RSU distributed units.

According to yet another embodiment, the central unit of the base station or the RSU-CU or a combined central unit of the base station and of the RSU-CU configure the resource pools to be used by the common MAC layer for RSU communications over the air.

According to another embodiment, the central unit of the base station or the RSU-CU or a combined central unit of the base station and of the RSU-CU configure the resource pools to be used by the second UE.

According to yet another embodiment, the common MAC layer of the combined one or more distributed units selects the time-frequency resources for the second UE operation.

According to another embodiment of the present invention, is defined a method for radio network operation, comprising:

providing a Road Side Unit (RSU) enabled to communicate over the air with at least one User Equipment (UE) while using a device to device technology and communicating over a backhaul link through a layer three protocol used for connecting infrastructure entities with a cellular base station;

transmitting control messages from the base station to the RSU over the layer three protocol for indicating a time-frequency resource allocation for the operation of the RSU and/or for the operation of the at least one UE; and transmitting or receiving over the air to/from the at least one UE control information or user data related to a V2X (Vehicle to Everything) application while using resources within the time-frequency resource allocation for the operation.

According to yet another embodiment, the RSU transmits the information related to time-frequency resource allocation to the at least one UE.

According to another embodiment, the device to device technology and the layer 3 protocol belong to a cellular technology.

According to yet another embodiment, the device to device technology is defined by IEEE and the layer 3 protocol belongs to a cellular technology.

According to another embodiment of the present invention, is provided an apparatus for deployment in a radio network wherein a first user equipment (UE) used as a road-side unit (RSU) for providing V2X (Vehicle to Everything) services is partitioned into a central unit (RSU-CU) and one or more distributed units (RSU-DUs) and the RSU is configured to establish over the air communications with a second user equipment via at least one of the RSU-DUs using a device-to-device (D2D) cellular technology, while implementing at least a RRC (Radio Resource Control) protocol within the RSU-CU and implementing at least MAC (Medium Access Control) and at least a part of PHY (Physical Layer) radio layers within each of the RSU-DUs, the apparatus comprising:

at least one network interface;

a memory; and at least one processor, which is configured to operate as a RSU-DU and execute at least the MAC layer and at least the part of the PHY layer and to select or receive a selection of time-frequency resources for communication between the RSU and the second UE while using the D2D technology and to perform radio communication with the second UE in accordance with the selected time-frequency resources and the implemented protocols.

According to yet another embodiment, a cellular base station is partitioned in a central unit and one or more distributed units and the RSU-DU functions are included within the distributed unit of the base station, resulting a combined base station and RSU distributed unit including a common MAC layer, and wherein the processor of the combined distributed unit is further configured to select the time-frequency resources for RSU-DU operation, based on a message transmitted from the central unit, including a time-frequency resource pool allocation or available resources for RSU operation.

According to another embodiment of the present invention, is provided Road Side Unit (RSU) apparatus for deployment in a radio network wherein the RSU communicates over the air with at least one User Equipment (UE) while using a device to device technology and communicates over a backhaul link through a layer three protocol used for connecting cellular infrastructure entities with a cellular base station, the apparatus comprising:

at least one network interface;

a memory; and at least one processor, which is configured to receive control messages from the base station over the layer three protocol indicating a time-frequency resource pool allocation for the operation of the RSU or for the operation of the at least one UE and to communicate with the at least one UE for transmitting or receiving over the air information related to a V2X (Vehicle to Everything) application.

BRIEF DESCRIPTION OF THE DRAWINGS

For a more complete understanding of the present invention, reference is now made to the following detailed description taken in conjunction with the accompanying drawings.

The drawings do not represent an exhaustive representation of the possible embodiments of the invention and the invention is not limited to the arrangements presented in the drawings.

The drawings are:

FIG. 1—Represents the existing NR (New Radio) system architecture in TS 38.401 V15.4.0 (2018 December) including a NG (New Generation) stand-alone base station (gNB), a split base station including a Central Unit (CU) and Distributed Units (DU).

FIG. 2—Represents an architecture in which the gNB-CU is separated in Control Plane (CP) and User Plane (UP)

Figure 3:
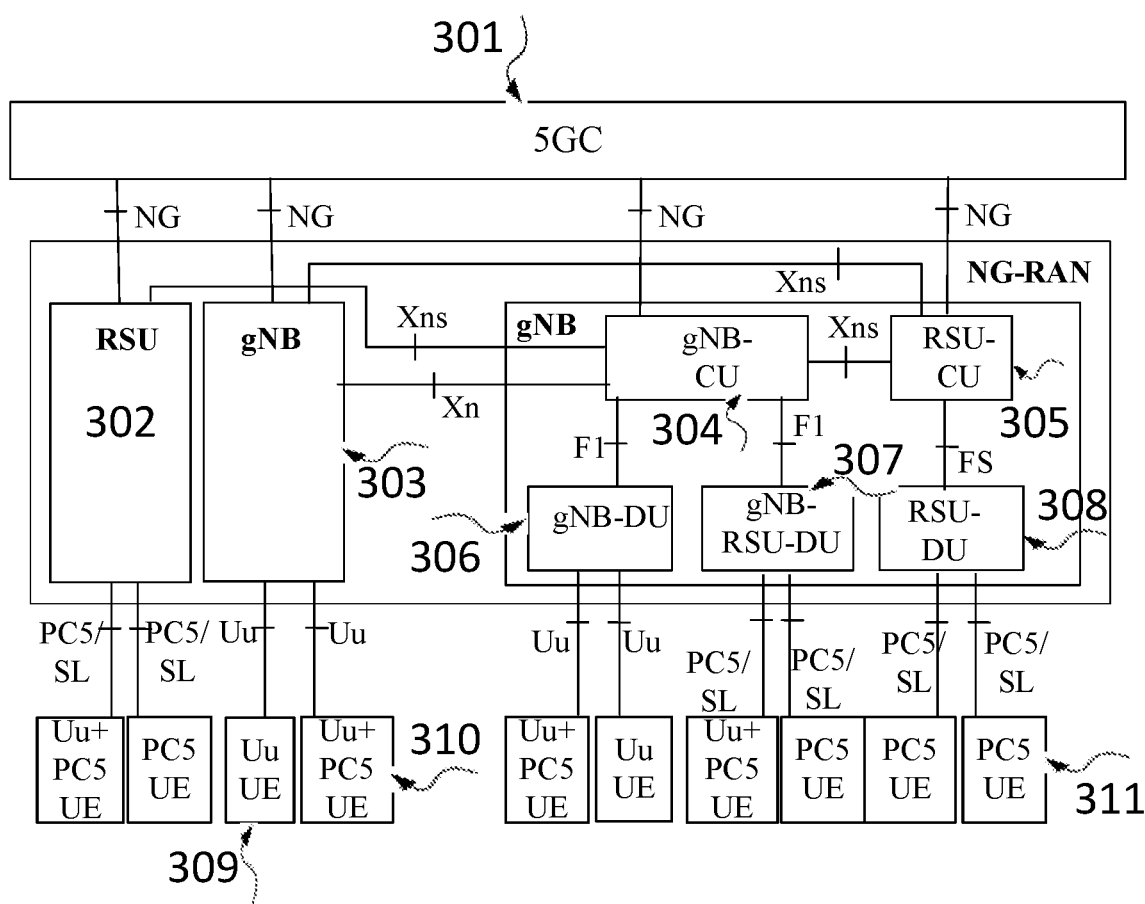
Figure 4:
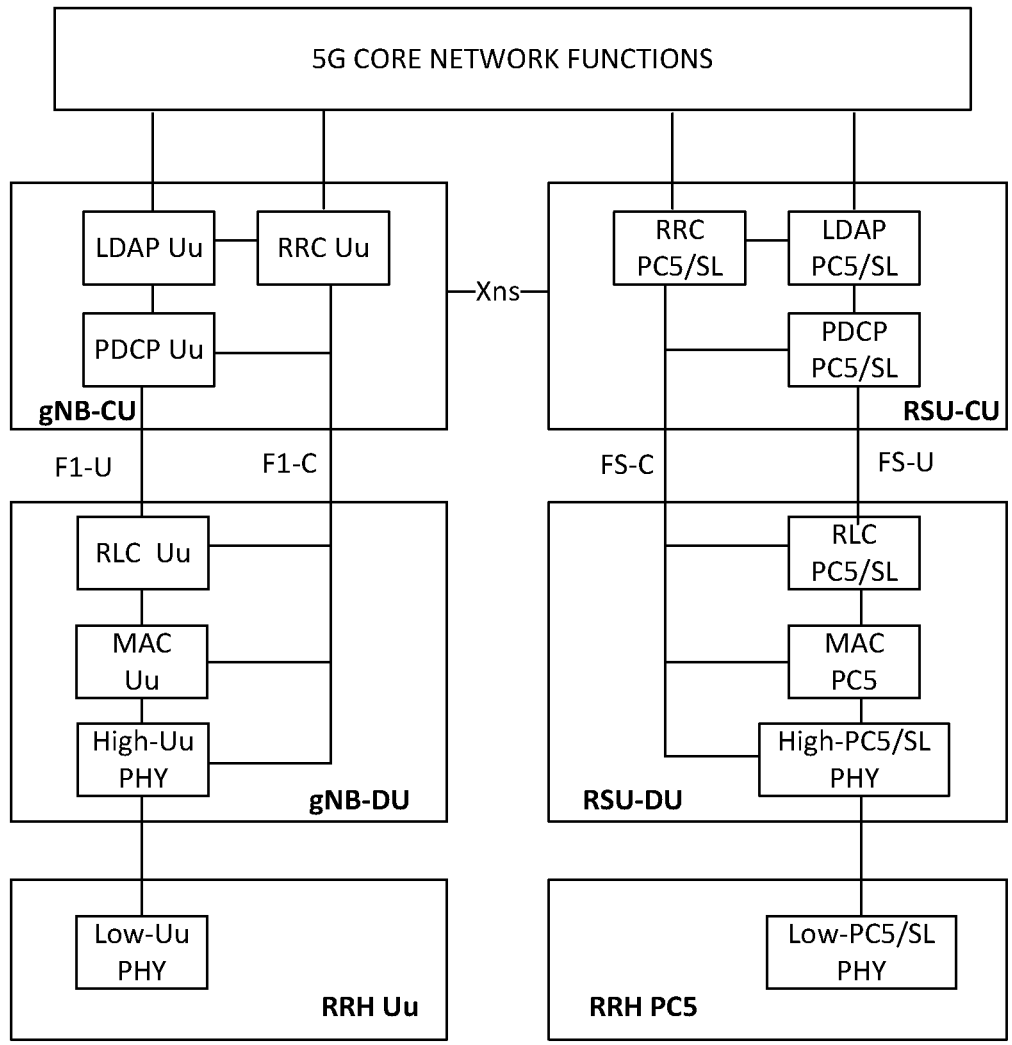
Figure 5:
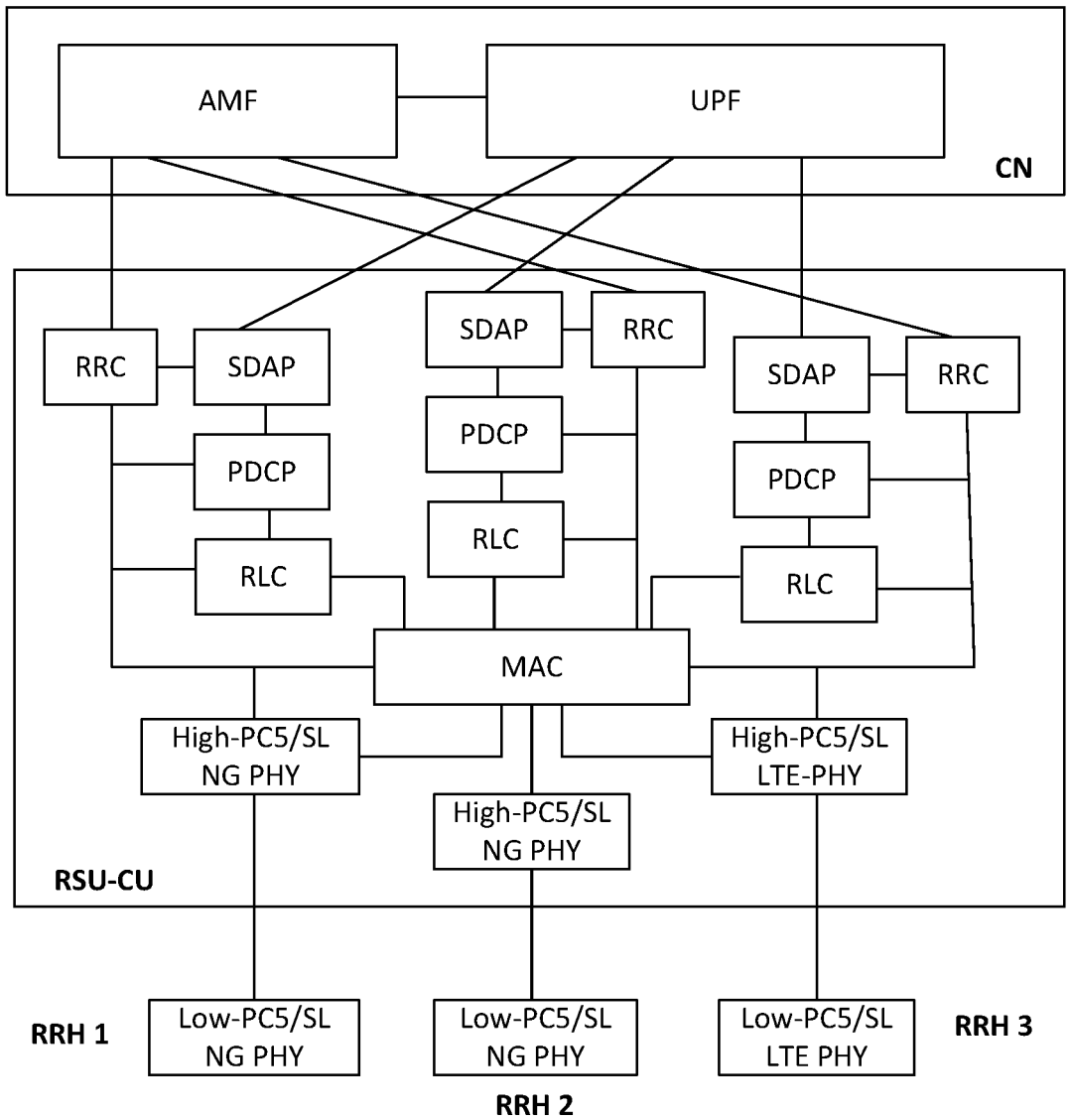
Figure 6:
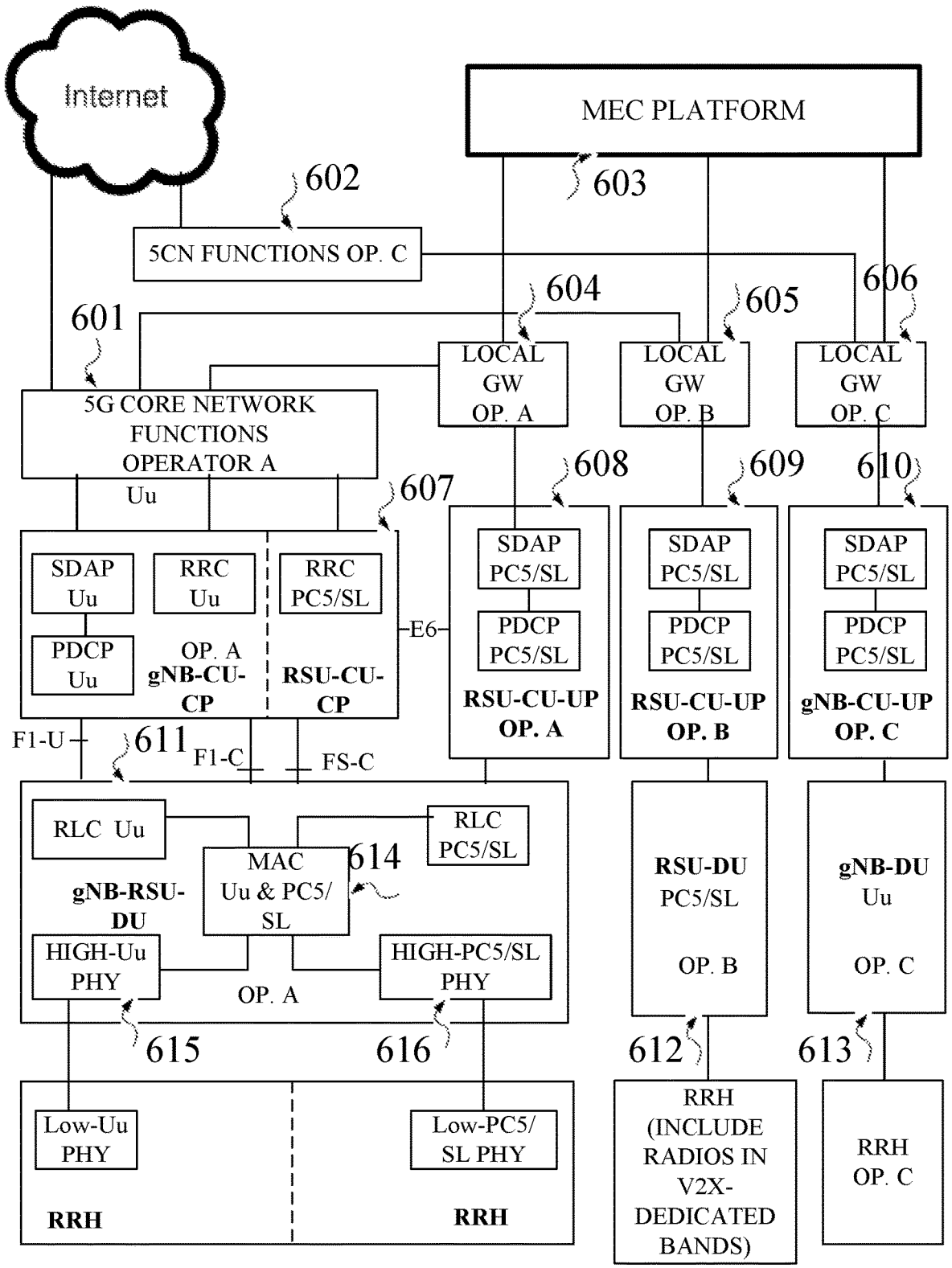
Figure 7:
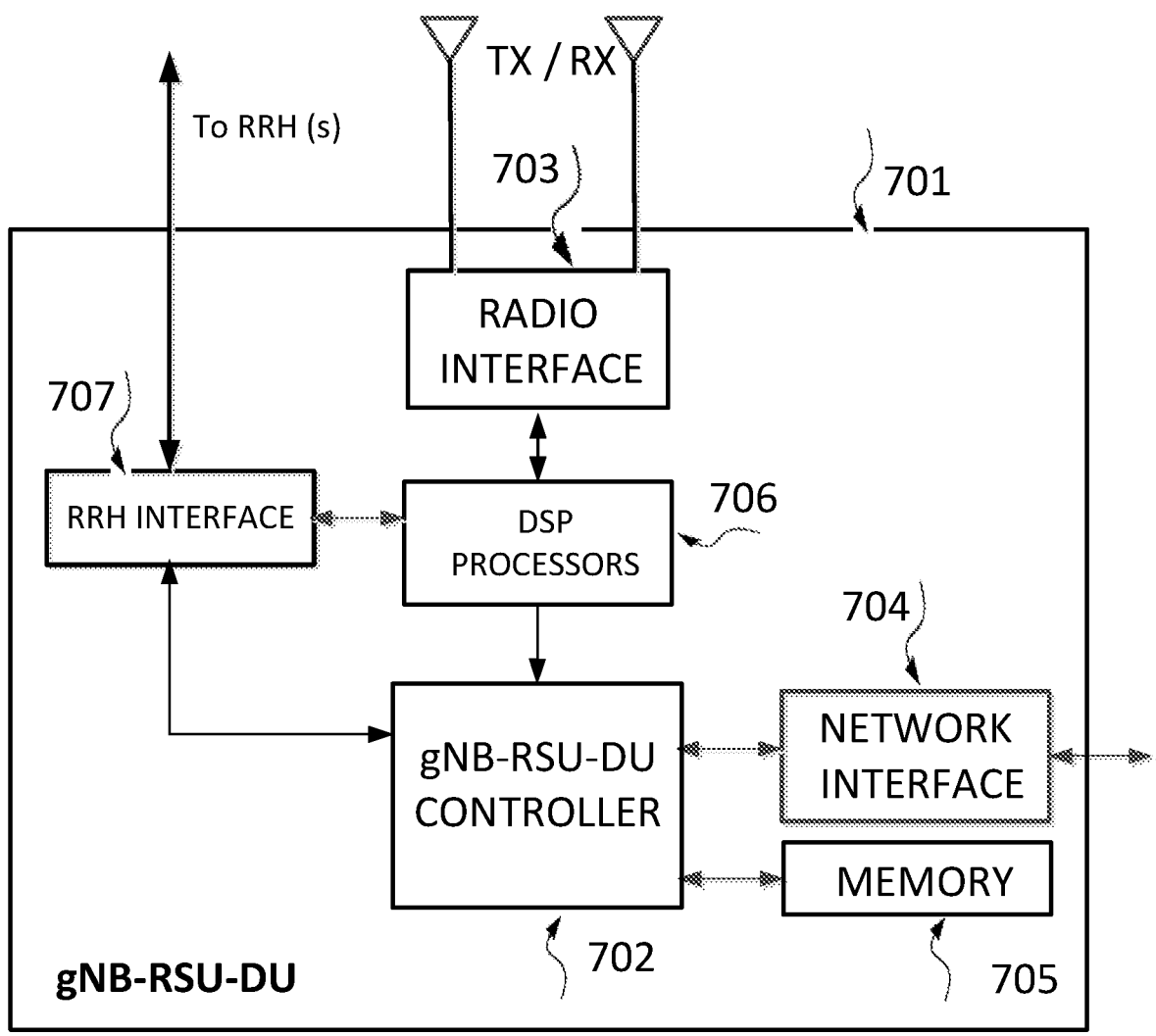

FIG. 3—Represents a system architecture based on an embodiment of this invention;

FIG. 4—Represents a High Layer split architecture with PHY (Physical Layer) split and RRH (Remote Radio Head);

FIG. 5—Represents a low layer split architecture with common MAC (Medium Access Control) between a virtualized RSU (Road Side Unit) and an RRH;

FIG. 6—Represents an architecture with three Public Land Mobile Network Operators (PLMNs) and local breakout to the common MEC platform;

FIG. 7—Represents a combined gNB-DU and RSU-DU block diagram

Figure 8:
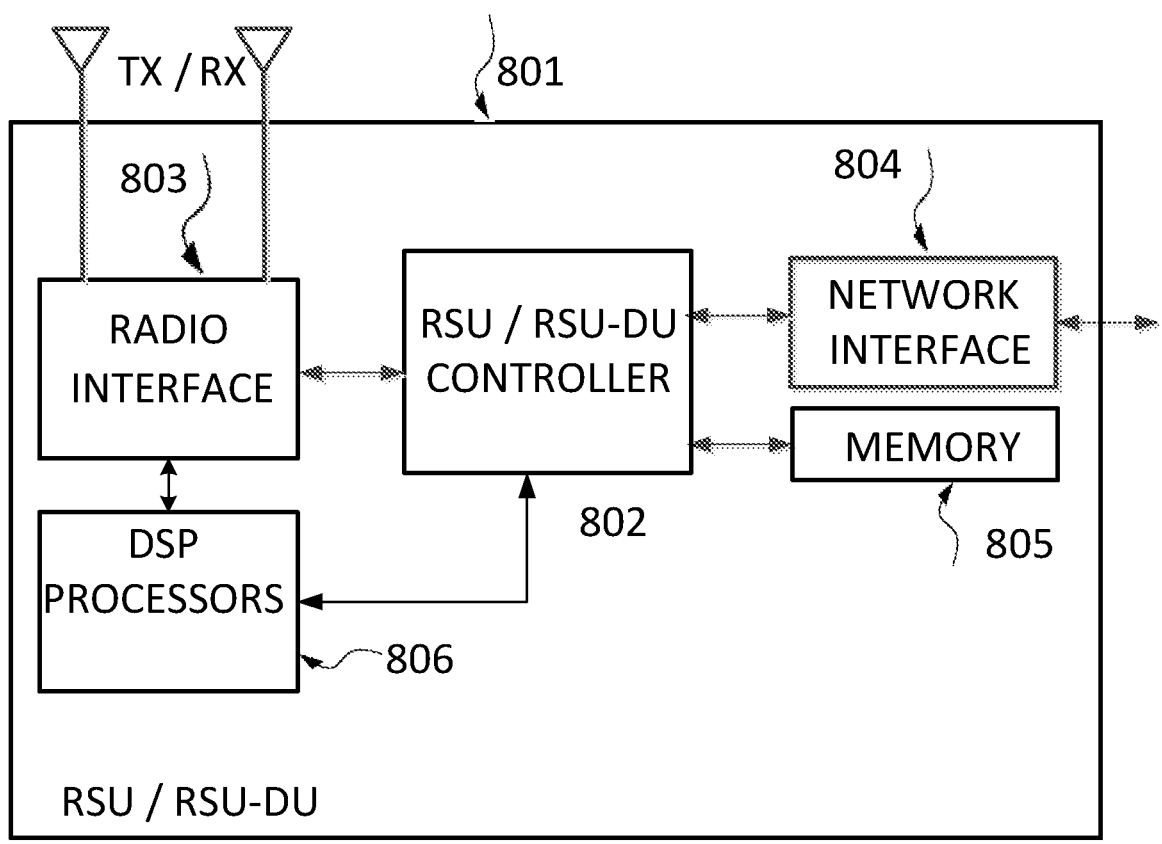
Figure 9:
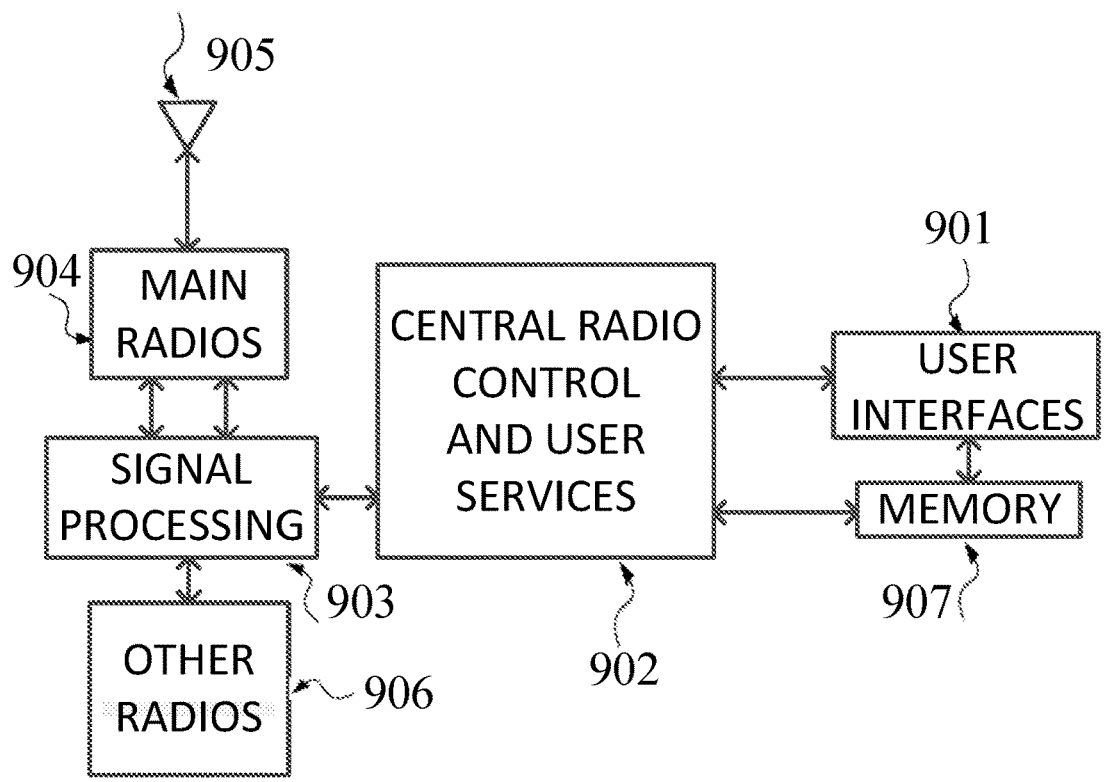

FIG. 8—Represents an RSU block diagram;

FIG. 9—Represents a UE (User Equipment) block diagram; and

Figure 10:
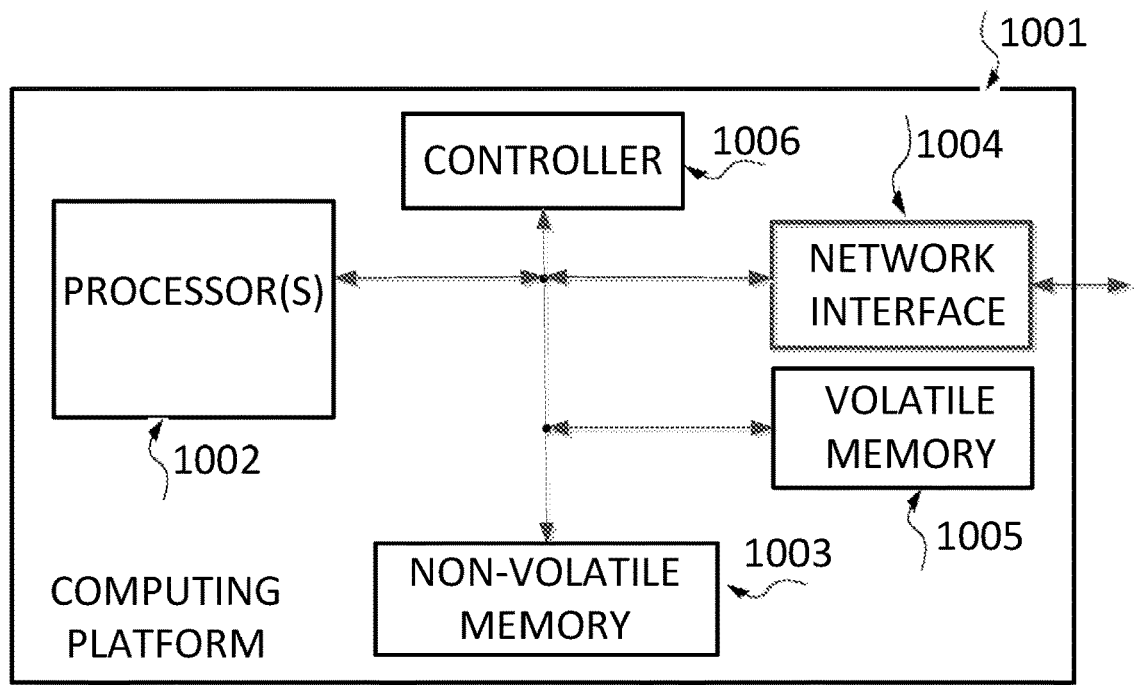

FIG. 10—Represents a computing platform block diagram.

DETAILED DESCRIPTION

In the following description, for the purposes of explanation, numerous specific details are set forth in order to provide a better understanding of the present invention by way of examples. It should be apparent, however, that the present invention may be practiced without these specific details.

The following description uses terminology familiar to those skilled in the art of wireless cellular networks and in particular in LTE (Long Term Evolution) and NR (5G) technology. However, this fact should not be considered as restricting the applicability of the invention to these technologies, and it should be understood that the present invention also encompasses other similar technologies as well as evolving cellular technologies.

FIG. 1, based on 3GPP TS 38.401 V15.3.0 (2018 September), represents the existing art of base station deployment, where the NG-RAN (New Generation—Radio Access Network) consists of a set of gNBs connected to 5G Core (5GC) through the NG interface. Several gNBs can be interconnected through the Xn (X new) interface.

A split gNB may consist of a gNB-CU and one or more gNB-DU(s). A gNB-CU and a gNB-DU are connected via F1 (F coming from fronthaul) interface. A base station connects to a UE through the Uu (base station to UE) interface.

The same document provides the definitions of gNB-CU and gNB-DU, where the referred protocols are used in gNB communication with the UE over Uu interface:

"gNB Central Unit (gNB-CU): a logical node hosting RRC (Radio Resource Control), SDAP (Service Data Adaptation Protocol) and PDCP (Packet Data Convergence Protocol) protocols of the gNB or RRC and PDCP protocols of the en-gNB that controls the operation of one or more gNB-DUs. The gNB-CU terminates the F1 interface connected with the gNB-DU".

"gNB Distributed Unit (gNB-DU): a logical node hosting RLC (Radio Link Control), MAC and PHY layers of the gNB, and its operation is partly controlled by gNB-CU. One gNB-DU supports one or multiple cells."

In FIG. 2—prior art—is described the concept of gNB disaggregation, in which a gNB may consist of a gNB-CU-CP, multiple gNB-CU-UPs and multiple gNB-DUs.

The gNB-CU-CP is connected to the gNB-DU through the F1-C(C from Control) interface;

The gNB-CU-UP is connected to the gNB-DU through the F1-U (U from User) interface;

The gNB-CU-UP is connected to the gNB-CU-CP through the E1 interface.

Road Side Unit (RSU)

An RSU is essentially a UE communicating with other UEs by using the side link (SL)/PC5 communication defined in 3GPP based on an adaptation of the Uu interface. The protocol stacks used in this communication are PHY, MAC, RLC, PDCP and RRC.

The sidelink interface may use NR technology, LTE technology or other technologies, and can use bandwidth parts (cells) comprising licensed or un-licensed time-frequency resources.

An RSU may be connected to Internet by wired or wireless backhaul for communicating information between the RSU and different applications, including road safety V2X applications or management applications.

Integration of RSU in RAN Architecture

In embodiments of this invention that are described hereinbelow, the RSU is integrated in the NG RAN architecture as shown in FIG. 3.

The RSU can be stand-alone (302) or can be implemented s by splitting its functions between two or more physical elements.

The most important feature of the functional split is the central location of its control plane, enabling centralized control of the time-frequency resources on SL/PC5 interface and tight interaction with the base stations providing spectral resources for V2X operation.

The main entities used in case of RSU split are the RSU-CU (Central Unit) and RSU-DU (Distributed Unit). In the case of functional split, the higher layers of the RSU in its communication over SL/PC5 are located within a CU (gNB-CU (304) or RSU-CU 305) and the lower layers are located within a DU, which can be gNB-RSU-DU (307) or RSU-DU (308). The gNB-CU may include the processing of the higher layers of the RSU, or there may be a separated RSU-CU logical node (308). The logical interface connecting the RSU-DU with the RSU-CU is named FS in this document. In practice this interface will have some overlapping functionality with the existing F1 interface as described in 3GPP TS 38.473.

The messages transmitted over the FS interface could be included within F1 in future 3GPP specifications.

As shown in FIG. 3, the interface between gNB-CU and gNB-RSU-DU is an enhanced version of the existing F1 interface.

In the high layer split of the UP (User Plane), the gNB-CU/RSU-CU include in an embodiment of this invention the RRC, SDAP and PDCP layers.

SDAP will map between a QoS flow and a data radio bearer and will also mark the QoS flow ID in both DL and UL packets. In addition, SDAP will route/forward the packets towards the UE, i.e. to the suitable RSU-DU in a similar mode to user plane routing over F1 interface.

The RRC layer within RSU-CU will provide the protocol for radio resource control (including radio resource configuration and measurements configuration) of the RSU-DU (given that the RSU is actually a UE) or of the entire RSU operation and/or of the UEs connected to RSU.

The PDCP sub-layer will provide similar functionality with the PDCP stack in the gNB-CU, by using the remote PC5-UE context (including encryption keys) for executing the encryption/decryption of RRC control messages and of user data arriving from the Core Network (301) and going towards the SL/PC5 or respectively arriving from SL/PC5 and egressing towards the Core Network.

An embodiment of this invention includes a PDCP sub-layer on the RSU-DU or on the gNB-RSU-DU, to be used for user data encryption/decryption of the RSU side in PC5/sidelink communication with a remote UE.

Another embodiment includes a PDCP sub-layer on the RSU-DU or on the gNB-RSU-DU, for the encryption/decryption and integrity protection of control messages using RRC or a dedicated protocol. This is needed in order to avoid the delay of the information transmitted by UE over RRC to RSU-DU, which based on the current gNB architecture travels through gNB-DU to gNB-CU and is relayed over F1 from gNB-CU to gNB-DU.

In another embodiment, the RSU may have its own security user context and keys, to be provided to its own PDCP sub-layer on RSU-CU or on gNB-CU or by another configuration.

The lower layers comprised in RSU-DU include the RLC, the MAC adapted for NR Sidelink interface and the NR Sidelink PHY.

In a disaggregated architecture the gNB-CU or the RSU-CU will be split into a CP (Control Plane) node gNB-CU-CP or RSU-CU-CP, including at least the RRC and the Central Control/Coordination functions, for example a part of the RRM (Radio Resource Management).

The RSU-CU-UP or the gNB-CU-UP can be split, such that each UP node will be in proximity or incorporated within a computing platform serving specific V2X-related applications, for example vehicle platooning, sensor fusion, extended sensors, advanced driving, remote driving, etc.

In another embodiment, the stand-alone RSU can connect over Xn/Xns (—here defined for RSU, but can be integrated in Xn) logical interface to gNB-CU, behaving similarly with a base station.

In another embodiment the RSU or the RSU-CU can connect to the Core Network through the NG interface (or an enhanced version of this interface), as indicated in FIG. 3.

In all these embodiments the stand-alone RSU will implement at Layer two the protocol stacks suitable to Sidelink V2X and at Layer 1 (PHY) the Sidelink V2X physical layer.

The RSU may also implement a low layer split (only part of the PHY on the standalone RSU or on RSU-DU or on gNB-RSU-DU) for enabling the operation with remote radio heads.

Aggregation of User Traffic

The RSU-DU/gNB-RSU-DU will receive user traffic on one side from the RSU-CU or gNB-CU and on the other side from different UEs over the SL/PC5 air interface.

The traffic received from a UE over the air, while using the SL/PC5 air interface, will be forwarded to gNB-CU/RSU-CU over F1/FS interface when the PDCP sub-layer is in gNB-CU/RSU-CU.

The traffic received from the gNB-CU/RSU-CU may be forwarded over SL/PC5 to another RSU-DU in unicast mode or to several RSU-DUs in broadcast/multicast modes.

Resource Allocation for Sidelink Operation with Existing Architecture

Based on the approach in TR 38.885, the resource allocation in the NR dynamic mode (Mode 1) shall be done by the base station. Given that in the high layer functional split the MAC protocol stack, in charge with scheduling, is located in gNB-DU, it is natural to assign the MAC sublayer in gNB-DU for executing the scheduling of the NR sidelink resources to be used in Mode 1.

In the existing art, the scheduling information is sent using signaling transmission over Uu interface, the Uu side of the UE decodes the information and transmits it to the PC5 part of the UE over a new interface, let's call it SLn.

Such a UE including both Uu and PC5 support is shown in FIG. 3 as Uu+PC5 UE (310) connected over a Uu interface to gNB-303 or to gNB-DU-306, while a UE supporting only Uu is indicated as Uu UE (309) and a UE supporting only PC5/SL (based on this invention) is indicated as PC5 UE (311).

It is not clear if the solution can work also for scheduling resources in the un-licensed V2X spectrum, as the MAC entity in Operator's base station not operating in these frequencies has no visibility of the resource assignment in such frequencies.

Resource Allocation for Sidelink Operation with Partitioned RSU

In an embodiment of this invention the messages reporting the existing time-frequency resource allocation or the available resources for SL/PC5 operation in the operator licensed spectrum are included/embedded in a layer 3 protocol (F1, FS, Xn, Xns) and are used by the MAC protocol stack of the RSU-DU for selecting the time-frequency resource for operation and scheduling the transmission or reception of user data, which takes place immediately based on the selected time-frequency resources.

The regular gNB-DU does not decode the messages sent by RRC and encoded by the PDCP sub-layer in gNB-CU, given that there is no PDCP sub-layer in gNB-DU.

In an embodiment of this invention a gNB or gNB-CU controller or a central coordinator can communicate directly with an RSU or RSU-CU through a new interface Xns (see FIG. 3) connecting these entities.

Through Xns interface the gNB or the gNB-CU controller or the central coordinator can receive reports from the RSU or RSU-CU, which are pertinent to RSU buffers situation or to channel occupancy status. Other reports may be related to radio measurements as detailed in continuation.

In the reverse direction, the gNB or the gNB-CU controller or the central coordinator transmit information to the RSU or RSU-CU regarding time-frequency resources available in licensed spectrum or to be configured by RSU for SL/PC5 operation in licensed or un-licensed spectrum.

In case that another UE has requested that the resources will be assigned by the RSU, the messages indicating this request will be sent over the SL/PC5 air interface to RSU-DU and/or RSU-CU, the MAC layer in the RSU-DU or the controller in RSU-CU will assign or configure the time-frequency resource which will be coded in a message to be sent over the SL/PC5 air interface to the requesting UE. The requesting UE will decode the message. The MAC layer in the requesting UE will execute the transmission or reception based on the configured time-frequency resources.

The gNB-CU or RSU-CU may dynamically configure the resource pools to be used by the MAC protocol stack.

RSU in an LTE System

RSU based on this invention will behave at Layer 3 as an eNB (evolved NodeB). X2 interface will be used to connect at higher layers the RSU with an LTE base station. Si interface can be used to connect the RSU to the LTE Core network. The inter-eNB support of fast hand-over and interference coordination procedures will apply between an RSU and an LTE base station.

In case that the LTE base station (eNB) will be virtualized, it will have a similar functionality and protocol split as the virtualized gNB.

Data Transfer to V2X Applications

In automotive sensor sharing applications, each UE needs to share the sensor data with other UEs or with a computing platform. Based on the processing results, the software running on the computing platform may produce decisions related to vehicle speed, change of direction, break actuation, etc.

In the case of the prior art architecture, an SL/PC5 UE module will send the data over a proprietary interface SL1 to the Uu UE module which in turn will send it to a gNB-DU over Uu interface and the gNB-DU will send it over the F1 interface to gNB-CU.

In case of the architecture in an embodiment of this invention, the SL/PC5 UE module will send the sensor data over SL/PC5 interface to an RSU-DU which in turn will send it over the F1 or FS interface to gNB-CU or to the alternative RSU-CU.

The gNB-RSU-DU (or RSU-DU) will need to execute the data forwarding/routing to the gNB-CU-UP logical node relevant for the computing platform running the sensor sharing application.

Measurements and Central Coordination

In an embodiment of this invention an RSU can forward the results of its measurements or reports to gNB-CU or RSU-CU or other base stations. The measurements or the reports can be forwarded also to other base stations over layer 3 interfaces, like Xn/Xns/X2.

The RSU can receive and eventually relay also the measurements of connected UEs to gNB-CU or RSU-CU or other base stations.

The measurements can be used for taking hand-over decisions by the RSU or by other nodes. A centralized hand-over decision can be taken in CU and transferred to an RSU or an RSU-DU over the F1/F S/Xn/Xns/X2 interfaces.

Another use of measurements, for example the channel/BWP (bandwidth part) occupancy ratio, can be used by RSU or by central entities for load balancing on different frequency channels or between different RSUs.

The PHY measurements can reflect the received power on the bandwidth part or on a channel BWP, received power (for example RSRP) or interference to noise ratio (for example SINR) signal quality (for example RSRQ) on specific reference signals (for example on DMRS, SS, CSI-RS, SRS), channel/BWP occupancy ratio, channel/BWP busy ratio, etc.

The layer 2 sidelink measurements can include PRB usage, per PDU session PRB usage, Number of active UEs on sidelink, RSU to UE and RSU from UE packet delay, data loss per PDU session or per network slice, packet discard rate per RSU, per UE, per PDU session or per network slice, per RSU, per UE, per PDU session or per network slice scheduled throughput, data volume per RSU, per UE, per PDU session or per network slice, distribution of PRB usage per RSU, per UE, per PDU session or per network slice, PDCP delay per RSU, per UE, per PDU session or per network slice.

Measurements can be also provided by an application, for example delays, throughput, discarded packets as a total or per specific UE/RSU.

Control of Operation by a Central Entity

In an embodiment of this invention a central entity (Central Unit or a central control application dedicated to V2X or a central coordinator) could control the operation of an RSU or of the UEs connected to an RSU, based on the received measurements/reports as sent by an RSU/UE and/or application server and/or management entity.

The central entity can control the type of error correction, i.e. the parameters of a HARQ process or the mode of transmission (for example scheduled with dedicated resources, grant-free in pre-allocated resources).

The central control can also indicate which UE to be used as relay for extending the coverage of other UEs.

The central control can control the parameters of RLC sub-layer, for example selecting one of TM (transparent mode), UM (un-acknowledged mode), AM (acknowledged mode).

Coordinated Resource Allocation

A central entity can allocate time-frequency resources and/or power resources in a dynamic or semi-persistent mode for the operation of an RSU and of connected UEs.

The scope of the resource allocation can be lower latency, higher reliability, higher throughput.

The resources can be allocated per PDU session (application), for example a remote driving application can be allocated with resources in a licensed band for decreased latency and increased reliability. A platooning application may be allocated with lower or higher power, depending on local coverage requirements. A specific network slice may have a specific policy of resource allocation, for example a transportation company paying for the service may enjoy better resource allocation.

Operation in Up-Link or Down-Link FDD Channels/BWPs

In an embodiment of this invention the time-frequency resource coordination and eventually power resource coordination allows the usage by RSU of FDD downlink or uplink channels or of time-frequency resources in the BWP (Bandwidth Part) as allocated by a central entity or by an OAM entity.

Initial Messages

The messages to be exchanged over the FS/Xns interfaces will have a similar structure with the existing messages of F1/Xn interfaces.

The new messages will include IEs (Information Element) using identifiers related to source and destination (for example RSU ID, temporary UE ID, temporary group ID—used for platooning application) and specific IEs for the measurements reporting and for control, as specified above. For example, a control message for resource allocation will include time-frequency resource allocation: RF (Radio Frequency) channel ID, frame number, slot or sub-frame number, resource block ID, end of time-frequency allocation, etc.

The first message to be transmitted is F1/FS/Xn/Xns/X2 Setup for exchanging information needed by the RSU-DU and the gNB-CU for correctly interoperate on the F1/FS/Xn/Xns interface. This procedure shall be the first FlAP procedure triggered after a TNL (Transport Network Layer) association has become operational.

Another message may be related to bandwidth parts activation/deactivation for an RSU.

Architectures for RSU Low-Layer Split

The low-layer split is currently defined within the PHY layer of a base station and is based currently on eCPRI or the specifications of Open RAN Alliance. Both technologies divide the blocks/functions of the baseband processing, such to execute some of them, like FFT—Fast Fourier Transform (receive direction) and iFFT (transmit direction), on RRH.

In an embodiment of this invention is used a low layer split, actually a PHY split, for an RSU.

The high-PHY transmitter contains functions like resource element mapping, precoding, layer mapping, modulation, scrambling, rate matching and coding.

In all architectures the RRH includes the FFT or iFFT signal processing (FFT for receiver, iFFT for transmitter) and the respective A/D (Analog to Digital) or D/A (Digital to Analog) converters.

The base station PHY currently transmits OFDM signals and the UE PHY (both over Uu and PC5/SL) currently transmits SC-FDMA signals.

The PHY split between a H-PHY (high PHY) and L-PHY (i.e. low PHY) can take place in RSU-DU (see FIG. 4) or in the CU (see FIG. 5) or in or in a gNB-RSU-DU (see FIG. 6).

In FIG. 4 is shown a low-layer split at Uu and PC5/SL PHY level. The big advantages are:

A. Increased spectral efficiency, as the data to/from an RSU is not transmitted over the Uu interface as in the prior art, but on a wired link.

B. Fast scheduling, without using a Uu UE as relay, as in the prior art.

C. Reliable operation, as the over-the-air Uu link may fail.

D. Independence of antenna location, i.e. the base station Uu antenna and the RSU-RRH antenna can be placed in different locations, for example the Uu antenna can be on a tower while the sidelink/PC5 antenna can be next to the road.

In this figure the RSU-DU can include a high-layer split option combined with a low-layer split option, i.e. SDAP, PDCP and RRC of the PC5/sidelink RSU are virtualized in the RSU-CU, while the RLC, MAC and high-PHY are implemented in RSU-DU and the low-PHY is implemented in RRH.

In FIG. 4 the RSU-DU-401 includes the High-PHY processing-403 and the RRH unit 402 includes the Low-PHY processing.

In the low-layer split implementation in RSU-CU (FIG. 5), all layers are virtualized in RSU-CU, with the exception of the low layer PHY which is implemented in RRH.

In FIG. 5 the RSU-CU-500 includes the High-PHY processing; the figure includes an example of multi-RAT (Radio Access Technology) operation, including both an NG (New Generation, aka 5G) High-PHY-501 and LTE High-PHY-503 and the corresponding RRH units 502 and 504 which include the Low-PHY processing. There is a common MAC-505 for scheduling the traffic on SL/PC5 air interface.

In FIG. 6 the High-PHY functions 615 and 616 of the two RATs (Uu and respectively SL/PC5) supported by the gNB-RSU-DU-611 are multiplexed in the radio frame under the MAC scheduling control.

The MAC sublayer supports the following functions: mapping between logical channels and transport channels, multiplexing of MAC SDUs from one or different logical channels onto transport blocks (TB) to be delivered to the physical layer on transport channels; demultiplexing of MAC SDUs to one or different logical channels from transport blocks (TB) delivered from the physical layer on transport channels, scheduling information reporting, error correction through HARQ and logical channel prioritization.

A special use case is the dynamic scheduling, i.e. per TB (Transport Block) transmission, while using PC5/sideling resources within the Operator managed spectrum (mainly licensed).

In such cases is preferable to have a single MAC entity (FIG. 5—505 and FIG. 6—614) for both Uu and sidelink-PC5 activity. The MAC entity will decide the scheduling based on per packet priority and will decide on resource allocation in licensed spectrum or/and license-exempt spectrum.

Carrier aggregation can be used between carriers in licensed and un-licensed spectrum, while avoiding interference to other UEs and resolving the in-device coexistence between transmissions and receptions on different frequencies.

The RSU appears to the Core Network as a Base Station. The AMF (Access Management Function) in NR-5G or the MME (Mobility Management Entity) in LTE will provide to the RSU and to the remote PC5 UE the security and/or integrity information. The AMF will select the suitable UPF (User Plane Function—Service GW in LTE) and will control the UPF (GW in 5G-NR) for the appropriate handover of the UP traffic through the appropriate RSU-CU or RSU standalone (un-split).

The packet forwarding may use different UPFs for routing towards Internet or to the MEC platform. A given application (for example sensor sharing or remote driving) may use the application server on the MEC platform and both V2X dedicated spectrum, if suitable RRH exists and the 5QI requests are matched or exceeded in this V2X dedicated spectrum, and licensed spectrum.

In a 5G system two RSUs may inter-connect one to each other or one to a base station as shown in FIG. 3, by using a Xn or Xns or similar interface; in LTE system two RSU may inter-connect using a X2 or Xns interface or similar.

In X2 API (Application Program Interface), the Load Information procedure includes COMP (Cooperative Multi-Point) functions. The existing COMP functions refer to eNB downlink operation.

In an embodiment of this invention, both NR and LTE, if the RSU operates in a time-frequency resource used by a Uu interface in the same area for uplink or downlink, the cooperative procedure for power control shall be applied between RSU spectrum resources and Uu resources both belonging to the PLMN; the Xn/X2/Xns interfaces should be used.

Scheduling by RSU in the Un-Licensed V2X Dedicated Spectrum

Currently, the V2X un-licensed dedicated spectrum is allocated in 5.9 GHz and this frequency is perceived as "out-of-coverage" for a Uu interface, given that currently the NPLMs cannot manage and use this spectrum. The standards recommend for the PC5/sidelink UE self-scheduling based on sensing.

Architecture-wise, this means that a specific MAC entity may be needed for operation in these cells (bandwidth parts) and specific RRHs. This MAC entity may or not be provided by an Operator.

A special case is the operation in the V2X dedicated spectrum by an Operator not having Licensed spectrum, for example for RSU RRH deployment in intersections or not visible parts of the roads, where most accidents are taking place.

In an example for this case, the Core Network in FIG. 4 can be replaced by a local breakout solution, connecting the relevant user traffic to applications on Internet and/or to a MEC platform.

Architecture for Local Breakout

In general, when the RAN resources are not shared, the gNB-CU connectivity of the RSU-DU is done per specific PLMN Operator. This Operator can provide resources within its licensed spectrum for scheduling the V2X operation of some customers, for example truck companies, self-driving cars, public safety entities.

However, in most road safety applications, all the road users need to communicate one to each other, by using either the un-licensed V2X spectrum or a common Application Server, collecting the PC5-UE transmissions in each Operator's spectrum and/or in V2X dedicated spectrum, the Server being located in Internet or on a MEC platform.

A UE carrying one or more USIMs can be offered spectrum resources for operation in the respective PLMN licensed bands.

The above situation creates a gap between the connectivity level and the application level, as the UEs without USIM will not be able to use an Operator networking resources for connecting to application Servers.

The solution is to provide RSUs linked directly, through local breakout, to the MEC computing platform, on which will run the road-related applications and possibly the software of the RSU-CU-UP, i.e. the User Plane (UP) of the RSU-CU. Given that the processing in a data center needs layer 2 addressing, the best connection between a specific RSU and the specific processing card is at Layer 2.

This creates a new network architecture for RSU implementation and virtualization, as presented in FIG. 6.

In this figure the Operator A provides Uu and PC5/SL services, Operator B provides only PC5/SL services and Operator C provides Uu services. Operators A and C have deployed Core Networks-601 and respectively 602, while all operators have access to a common MEC platform 603 through the local Gateways (GW) 604, 605 and 606.

We exemplify this architecture as an extension of the architecture in FIG. 4, with the understanding that some application servers of PC5/SL UEs may be located in Internet, and their traffic will pass the Core Network, while other application servers of PC5/SL UEs may be located on the MEC platform and use the RSU-CU-UP and the local breakout solution.

All operators implement local breakout giving access to the MEC platform.

The example in FIG. 6 shows a disaggregated architecture for all Operators, each deploying a RSU-CU-UP (608, 609) or a gNB-CU-UP (610).

This example is using the local breakout on UP only, while the RSU-CU-CP-607 is standalone or integrated with gNB-CU-CP). The new control interface E6, described later as an embodiment of this invention, connects the RSU-CU-CP-607 with RSU-CU-UP-608.

Alternatively, the E1 interface can be enhanced with the functions of E6 interface.

The RSU-CU-CP (Operator B) and gNB-CU-CP (Operator C) are not shown due to lack of space. It should be noted that Operator B may execute its RSU-CU-CP functionality on the MEC platform or on a separate virtualization platform.

Operator A uses a gNB-RSU-DU-611 providing both PC5 and Uu connection, while the multiplexing of time-frequency resources for each technology in the licensed spectrum is controlled by a common MAC-614.

In a variant, the RSU SDAP and PDCP functionality is implemented in gNB-RSU-DU instead of having a separate RSU-CU-UP-608. This means that the RSU SDAP is connected directly to the Core Network and/or to the Local GW-604.

In another variant the gNB-RSU-DU can have a shared MAC for traffic scheduling for both Uu and SL/PC5 in licensed bands and a separate MAC for traffic scheduling in un-licensed bands.

Operator C provides only Uu connection through the gNB-DU-613. In addition, Operator C provides scheduling services for the supported V2X applications by using the Uu interface to communicate with a UE including both Uu and PC5/SL interfaces (the prior art).

Operator B deploys the RSU-DU-612 providing only PC5/SL connection for their RSUs in the un-licensed spectrum dedicated to V2X operation, but use a spectrum sharing approach with Operator A and Operator C, i.e. uses parts of Operator A and Operator C licensed spectrum for operation over PC5/SL.

The spectrum sharing application can be located on the MEC platform. Operator A provides resource pools within its licensed spectrum to be used for specific applications in their specific V2X business slice.

The information regarding the available resource pools in the licensed spectrum for being used by a specific DU are provided to the spectrum sharing application through messages transmitted preferably by encapsulating the control plane (spectrum management belongs to the control plane) over the user plane passing the Local GW.

In the ingress direction, the Local GW should take out the encapsulation and restore the control plane address of a specific RSU-DU or gNB-DU or RSU-CU or RSU-CU-CP.

Alternatively, can be used different port numbers for user plane and control plane.

Forwarding of User Data to the MEC Platform

RSU antennas can listen to the medium and the RSU can forward the messages transmitted over PC5/SL air interface to the corresponding Application Server and particular application, identified by an application ID. Please note that the application ID is different from PDU session ID, which is relevant only for a specific UE.

The V2X application ID may be provided by forums such as ISO (International Organization for Standardization) in the document ISO 17419:year, INTELLIGENT TRANSPORT SYSTEMS—COOPERATIVE SYSTEMS—GLOBALLY UNIQUE IDENTIFICATION.

The V2X application uses its own identifier for a specific V2X vehicle or human. Messages transmitted on SL/PC5 interface use a specific layer 2 ID for each device and application. As the layer 2 IDs for communication over radio may be provided by the PC5 UE, are needed two steps:

A. The V2X application client in the UE has to know the specific vehicle or human ID for a PC5 UE, if the application (on Server) uses it, and to transmit it to the hosting PC5-UE.

B. The RSU-DU or the SDAP layer in RSU-CU-UP should be informed about the correspondence between the specific application ID and the layer 2 ID used over the PC5/SL in order to forward the packed to the right application on MEC platform.

May be different Layer 2 identifiers, one for RSU communicating over SL/PC5 as a regular PC5 UE and others for RSU acting as relay to Application Servers in Internet or on a MEC.

The Layer 2 identifier (for RSU or UE) may be specific to each forwarding target, i.e. the Layer 2 identifier for forwarding to Internet through the Core Network will be different from the Layer two identifier for forwarding to a MEC platform. If multiple MEC platforms are used, for each MEC platform will be a specific RSU Layer 2 identifier.

The RSU may tunnel the received packed with a specific source Layer 2 ID to the relevant MEC platform or to the Service GW (UPF) in the Core System. A GTP (GPRS Tunneling Protocol) protocol could be used for encapsulation. In the reverse direction, the source Layer 2 ID may be used as destination Layer 2 ID or may be used to derive the destination Layer 2 ID.

In case of multicast or broadcast the PC5 UE may allocate a layer 2 identifier for each specific group formed at the application layer. The RSU will be informed regarding the correspondence between the specific group identifier at the application level and the layer 2 ID used for a specific group over the PC5/SL interface.

In an embodiment, the messages at application layer shall include at least the application ID at a specified position in the message, such to be decodable by the PC5/SL PDCP sub-layer or SDAP layer.

The PDCP/SDAP layer should either encapsulate the message or insert the applicable MEC IP address or MEC Application Server IP address instead of the Application Server IP Address, known by UE, allowing the message to be forwarded to the Local GW and from here to the specific MEC platform (may be more than one) or to Internet. Layer 2 Application Server Address can be used instead of IP Address.

Other qualifiers needed to forward a packet to a specific MEC platform could be:

A. UE or RSU RRH location information;

B. A business code indicating whether the UE has access to a specific MEC platform. For example, the application of platooning for trucks may be addressed by a first MEC platform, while general platooning may be addressed by a second MEC platform. Essentially same application ID may be used for both, but the MEC platform differentiation will be done based on the business code.

The business code may be related to a specific contract between the MEC or cellular Operator and the enterprise or government entity contracting the service.

For example, the remote driving or the sensor fusion may be contracted by an enterprise, while the road safety may be contracted by a government.

The business code may be provided by the Core Network to the PC5/SL UE through Non-Access Stratum RRC signaling or may be provisioned in the PC5/SL UE. The business code should be included in S-NSSAI (Single Network Slice Selection Assistance Information) within the optional SD (Slice Differentiator) field mentioned in TS 38.300 v15.6.0 section 16.3.

The same SD field should carry the Application ID, which should be provided by UE through RRC signaling.

The SD field of S-NSSAI, should be used by RS-CU and RS-DU for implementing the forwarding of UE UP to a specific MEC platform during the UE mobility, either by using local breakout or by placing the MEC platform not far from the RSU-CU.

If the specific Application Server is not supported by the MEC platform, the user packet will be sent to the RSU-CU or to the UPF in the Core Network.

The replacement of the IP address with the MEC IP address can be done by an additional adaptation/routing layer on top of PDCP or SDAP layers or within the SDAP layer, as an added functionality. Currently the SDAP layer on the gNB-CU only executes the QoS marking for a DRB (Data Radio Bearer) and forwards the data to Core Network or PDCP sub-layer.

RSU Functional Roles

The PC5 sidelink runs only between the RSU antenna and the remote PC5 UE. The RSU has multiple functional roles:

A. Relay on UP and CP between the Remote PC5-UE and the gNB-CU or RSU-CU, for those control messages and user messages which run between the Remote PC5 UE and the gBN-CU or RSU-CU.

B. Terminator on UP and CP of lower layers between the Remote PC5-UE and the PC5-RSU for those control messages and user messages which run between the Remote PC5 UE and the RSU.

C. Switch and router of control messages and user messages which run between the Remote PC5 UE and the Application Server located in Internet towards the RSU-CU; if the SDAP, PDCP, RRC termination is in RSU-CU, means that the user data will pass the UPF (User Plane Function) in the 5GC for arriving at application servers with inherent higher delays as compared to the local breakout variant.

D. Switch and/or router of control messages and user messages which run between the Remote PC5 UE and the MEC platform, which means that the user applications can be located on a very near, short-delay, edge computing platform connected at Layer 2 (preferable) or Layer 3 through a local breakout solution.

E. The RSU may be connected to the gNB-CU, RSU-CU or to the gNB/RSU of different Operators; such connection will facilitate the RRC-connected operation of the RSU or of the remote PC5-UE, based on a USIM located in the PC5 UE and of the RRC messages for authorization of operation and security keys transmittal. This will allow lower cost realization of the PC5 UE, compared to the implementation of the Uu interface within the UE, requested by the existing 5G architecture, as the Uu interface will not be needed anymore.

In order to facilitate the routing, by the RSU-DU, of messages generated by a remote UE towards the gNB-CU or a CN of a specific Operator is needed that the remote UE will indicate within a message or message header the Identifier of the desired PLMN.

Another possibility is that the RSU-DU will broadcast the Level 2 address used for receiving messages for each specific PLMN Operator. This Level 2 address should be allocated by the RSU-CU over the F1/FS interface.

Yet another possibility is that there will be a specific context for each registered remote PC5-UE including the PLMN identifier; the RSU-DU will retrieve, based on the source Level 2 identifier, the associated context including the desired PLMN identity.

FS Interface

As previously explained, the RSU terminates the PHY, MAC, RLC, PDCP, RRC layers for the communication over PC5/SL interface.

The payload can be secured by using PDCP encryption and sent over F1/FS interface.

This behavior requires a forwarding layer for the uplink (remote PC5 transmission to RSU), which will select which packets are sent to the MEC platform and which messages will be sent to the eNB-CU or RSU-CU over the F1/FS interface.

The packets routed to the MEC platform should be also secured; however, these packets could be preferably sent in the native format, as opposed to the PDCP format, for not providing the external MEC platform with the security keys used in access network, and secured using IPSec or similar IETF protocols.

The QoS over the FS interface will be pre-configured for RRC messages and will be set by the SDAP layer in CU on the user plane for a specific data session. The RSU side can use reflective QoS within the same data session.

E6 Interface

E6 interface is used for the RSU-CU-CP to send the security information (integrity and cyphering algorithms and keys for RAN operation) to the RSU-CU-UP to be used by PDCP sub-layer.

In addition, E6 includes messages for control of SDAP and PDCP sub-layers.

In the reverse direction, RSU-CU-UP may inform the RSU-CU-CP regarding the per specific UE amount of traffic (data volume) towards/from the UPF. These reports may be further used as billing information.

Local Breakout—More Aspects

Connecting to the MEC platform without passing through the Core UPF (User Plane Function) means actually executing a local breakout. The local breakout should use secure IP routers or can be done while using Layer 2 secure bridges. In case of local breakout, the QoS marking of the data flow by the MEC platform (i.e. the application Server of the MEC platform) could be used in DL over the PC5 interface and the reflective QoS could be used in up-link.

S-NSSAI for V2X may be used for PC5/SL UEs.

The packets may be selected for local breakout based on the Application ID field provided by the application client in the remote PC5-UE while considering the match between the application ID and the applications supported by the MEC platform to which the RSU is connected.

In case of handover from an Application Server to another, as happens with the MEC concept, the application context with the old server shall be forwarded to the target application Server.

The list of supported applications ID will be configured in the RSU or will be provided through a message (s) by the MEC platform administrator/manager/orchestrator directly to the RSU or will be provided through the gNB/gNB CU.

For executing the local breakout is needed to implement the PDCP and SDAP layers on a RSU-CU-UP which may be collocated with the RSU-DU or with a RSU-DU or within the MEC platform.

The Security information, (integrity and cyphering algorithms and keys for RAN operation) needed for securing at PDCP sub-layer the communication over the user plane, will be transmitted from RSU-CU-CP to RSU-CU-UP over the E6 interface. The security information may be used not only for RSU communication with the remote UE, but in an embodiment of this invention also from MEC to UE direction, UE to MEC direction or both.

For executing the local breakout is needed a local UPF (User Plane Function), actually a routing function implemented on a software platform or as a stand-alone router.

Advertising an RSU and its Capabilities

An RSU in an embodiment of this invention use the sidelink/PC5 Sidelink Control Channel for broadcasting its capabilities, some being detailed below:

A. Supported PLMNs including NAS connection to Core system for receiving security information for RSU broadcast/multicast/unicast;

B. Supported PLMNs including support of NAS connection to Core system for receiving security information for a remote PC5/sidelink UE for unicast/multicast/broadcast;

C. Supported frequency channels or BWPs.

D. RAT Technologies for PC5 (LTE, 5G, etc.) with details of PHY (intercarrier spacing, slot duration, sub-frame duration, etc.) for each one E. Connection to the Application(s) server (Network relay): Layer 2 (MEC platform), Layer 3 (MEC platform), Layer 3 through Core System F. Translation of per packet network sub-slicing information to priority and QoS over PC5, including the use of Operator's licensed spectrum. Sub-slicing is, based on this invention, a business-wise differentiation of V2X/PC5 applications within a V2X slice. For example, remote driving requiring stringent QoS metrics will have a different sub-slice than platooning or sensor sharing.

G. Scheduling of transmissions over PC5/sidelink by RSU MAC.

H. Scheduling of transmissions over PC5/sidelink by a common RSU-DU and gNB-DU MAC entity.

I. Operation with no Uu interface for listed PLMNs.

J. PC5/SL layer 2 ID distribution for each group broadcast/multicast and for each Application for remote UEs, such to get a relation between a transmission over PC5/SL and the related application ID, group ID and destination PC5/SL UEs.

Out-of-Coverage (OOC)

In 2014, 3GPP RAN2 has agreed of the "in coverage" definition as "A UE is considered in-coverage if it has a serving cell (CONNECTED) or is camping on a cell (IDLE)."—see R1-143092. This leaves multiple causes for being "out of coverage", some of them being:

A. UE without USIM

B. UE with USIM not finding its PLMN in the System Information of detected cells.

C. UE with USIM, but not supporting the radio technology used by the base station. As sidelink/PC5 is not supported currently by base stations, those UEs including PC5 but not including Uu are always "out of coverage". If a UE supports LTE but the base station supports only 5G, the UE is also OOC.

UE with USIM and having a match with the technology supported by base station, but not supporting the radio channel/BWP used by base station on that technology is OOC.

PC5-Only UE without Uu Interface

The current 5G V2X architecture in 3GPP TS 23.287 3GPP TS 23.287 V16.1.0 (2019 December) considers that a V2X UE not implementing a Uu interface cannot communicate with the NG (New Generation, aka 5G) RAN (Radio Access Network).

In practice, the existing low-cost V2X chips based on LTE technology not only that do not implement the Uu interface, but also do not include a USIM.

The consequences of SIM-less PC5-only UE are that such a UE cannot be authorized to use the Operator resources (spectrum, connection through the Operator infrastructure to Internet and to specific to V2X Servers or Smart Mobility Servers), that the spectrum resource pools are predefined only in the un-licensed spectrum and these spectrum pools cannot be adapted depending on traffic conditions, road topography, that the security and integrity keys based on USIM cannot be used, etc.

In an embodiment of this invention are provided procedures which could mitigate the impact of operation without a Uu interface for the case that the PC5-only UE includes a USIM. Same embodiments may be used for the general case of UEs operating Out of Coverage.

A first embodiment exploits the infrastructure RSU-DU. The PC5-only remote UE registers with the desired PLMN (Public Land Mobile Network) Operator using the USIM (Universal Subscriber Identity Module) information and using the RSU-DU as a relay in the communication with the gNB-CU and the AMF (Access Management Function).

As result of a successful registration with the PLMN's Core network the UE receives from the RSU-CU or gNB-CU through the RSU-DU to which the remote PC5-only UE is connected, the four keys used respectively for the integrity protection of RRC signaling, cyphering of the RRC signaling, integrity protection of user data and ciphering of user data for RSU-UE communication over PC5 and the security information consisting of PC5-only relevant parameters and relevant integrity and/or cyphering algorithms and keys, through an RRC message transmitted to the RSU-DU over the F1 or FS interface. For each radio bearer is maintained a counter which is also used by the cyphering algorithm.

The above procedure is currently used for the 5G communication over the Uu interface. In an embodiment of this invention, the same procedure is extended to the communication of the remote PC5/SL UE in the communication with the RSU or with the gNB or with the gNB-CU and AMF while using PC5 and an RSU-DU as relay.

In case of connection of the remote PC5-only UE to another gNB or RSU or gNB-CU or RSU-CU or RSU-DU or to an RSU-DU belonging to another gNB/RSU, the UE context consisting of UE Identifier and the security information will be transferred from the old gNB/RSU to the new gNB/RSU.

RRC Message Transmission by the RSU-DU

The RSU-DU can receive, over the F1/FS interface, Information Elements (IE) sent to UE by the RRC protocol stack located in the gNB-CU or RSU-CU of each NPLM.

The RSU-DU can ask the gNB-CU through message over the F1/FS interface to forward over F1/FS the System Information relevant to sidelink operation, (for example, in LTE MIB (Master Information Block), SIB1 (System Information Block 1), SIB18, SIB19, SIB21, SIB26), which determines the PLMN, the physical parameters of the cells supporting sidelink, supported frequency channels/BWPs, time-frequency resources in each normal and/or exceptional resource pool using licensed or V2X-dedicated spectrum (un-licensed), the relay operation, etc.

In an embodiment of this invention, the RSU-DU or gNB-RSU-DU will relay the IEs of the messages received over the F1/FS interface, or the MIB/SIBS received over the Uu by one or more embedded UEs which belongs to another PLMN, over the Sidelink Broadcast Control Channel (SBCCH), a sidelink channel for broadcasting sidelink system information over SL/PC5 from one UE to other UE(s).

For example, the SIBs which are broadcasted by the gNB-DU cannot be received by the PC5-only UE. These SIBs should be broadcasted by the RSU over SBCCH of the SL/PC5 interface such that a PC5-only UE will be able to receive them.

Preferably each operator will be allocated a Layer 2 identifier for the SIB(s) transmission by the RSU-DU over SL/PC5.

RSU System Information

In an embodiment of this invention, the RSU can create, by merging the data obtained from multiple operators with the MEC platform applications, a new system, application oriented, which speeds-up the execution of applications.

The RSU-DU may receive the System Information including the time-frequency resource pools of each PLMN allocated to V2X over F1/FS/Xn interface on one side and the spectrum or BWP requests and buffer status from each UE over the PC5/SL air interface.

Based on requests, buffer status, UE PHY and radio frequency capabilities for each of the supported RATs, the MAC layer on PC5 may schedule the transmissions over PC5 over the entire frequency spectrum provided by all PLMNs.

For example, if a broadcast request is made by a 5G UE serving a sensor sharing application, the broadcast transmission shall be made available to all PC5 UEs, including those using LTE.

First, resources are allocated for the NR transmission in frequency channel f1; the RSU receives the transmission, passes it through PHY layer, MAC, RLC, PDCP sub-layers and retransmits the result over the frequency f2 used by the LTE systems.

Alternatively, after the sensor information is processed by the relevant application, the result of processing is transmitted by the RSU using all the PC5/RATs involved.

The RSU-DU shall include multiple PC5 RAT for implementing the above functionality.

Cooperative Semi-Persistent (SPS) Scheduling

The base stations or the distributed units may allocate semi-persistent resource allocation for operation over the sidelink/PC5 interface. These allocations are transmitted by RRC signaling and indicate the time-frequency resource allocation and the repetition period or only the repetition period of a previously allocated time-frequency resource.

When the UE (could be a UE with both Uu interface and PC5 interface or only with PC5 interface) moves, it may go out of the coverage of the specific infrastructure unit which has allocated the semi-persistent resources (gNB, eNB, etc.) or (gNB-DU, RSU-DU) and enter the coverage of another infrastructure unit.

This new infrastructure unit may be asked by another UE to allocate semi-persistent resources; currently there is no 3GPP procedure to coordinate between the already allocated semi-persistent resources on sidelink/PC5 and the semi-persistent resources allocated by another base station on sidelink/PC5, such that collisions between transmissions of the first UE and of the other UE may occur in overlapping coverage areas.

A first solution to the problem is to limit the SPS validity as long as the UE is under the coverage area of the entity allocating the resources for SPS; the disadvantage is the resulting frequent handovers and scheduling requests. This solution is used currently for the UE scheduling over Uu interface.

A second solution is to introduce a validity SPS timer; the disadvantage is that collisions still can occur if a high-speed vehicle exits the coverage area of the infrastructure entity allocating the SPS.

A third solution is to use the network for announcing the existing SPS allocations per UE and per BWP or frequency channel to infrastructure units in the same area, including the RSU-DU. A collaborative group of infrastructure entities can be created at least within a NPLM network. In this solution the time-frequency allocation for a PC5 UE can be used also when the UE makes a handover from a cell to another. This solution can also use the time limitation of the SPS allocation.

A fourth solution is that UEs will transmit at request, on SL/PC5, the UE existing time-frequency allocations. In this way an RSU-CU will be able to get those allocations and share them over F1/X2/FS interfaces with other infrastructure entities.

The SPS related information can be sent in LTE over the X2 interface between the node providing the initial allocation and the other LTE nodes. In NR can be used the F 1/F S/Xn interface.

A fifth solution will provide separate resource pools for the RSU-DU cell, in un-licensed spectrum and in licensed spectrum. If the RSU-DU(s) is deployed in an intersection, it will provide time-frequency resources over SL/PC5 for each UE and application operating in its coverage area. Several RSU-DUs may collaborate for seamless handover between them. Such a handover may keep the same time-frequency resources for a UE and an application across the spectrum used by collaborating RSUs.

gNB-RSU-DU Implementation

The gNB-RSU-DU blocks shown in FIG. 7 are only by way of example; in practical implementations these blocks can be distributed on multiple circuit boards, and the control functions and hardware functions can be implemented on commercial processors or tailor-made logical arrays, such as system-on-a-chip, FPGAs, ASICs.

The blocks of the gNB-RSU-DU-701 include a controller-702, one or more DSP processors-706 connected to a radio interface-703, providing wireless communication over V2X sidelink and Uu interface with UEs and optionally may include an interface-707 to an RRH including a synchronization signal. The network (communication) interface-704 enables message transmission over the network, to gNB-CU or RSU-CU or gNB-RSU-CU or to the OAM (Operations, Administration and Maintenance).

The controller-702 includes a common MAC sublayer for assigning time-frequency resources to the connection of a first UE while using a Uu technology and to the connection of a second UE while using PC5/SL technology and as a subset of its functions, some functions such as scheduling of the reference signals and obtaining reports from a UE. A memory block-705, containing, for example, RAM and non-volatile memory (FLASH or ROM) is used by the central control unit-702. The data used by the controller-702 may be stored in the memory block-705.

RSU or RSU-DU Implementation

The RSU or RSU-DU blocks shown in FIG. 8 are only by way of example; in practical implementations these blocks can be distributed on multiple circuit boards, and the control functions and hardware functions can be implemented on commercial processors or tailor-made logical arrays, such as system-on-a-chip, FPGAs, ASICs.

The blocks of the RSU or RSU-DU-801 include a DSP processing unit-806, a radio interface-803, providing wireless communication over V2X sidelink with a UE, and the network (communication) interface-804 enabling message transmission over the network, to another RSU or RSU-DU or to the OAM (Operations, Administration and Maintenance) or to a Central Unit of a base station or to a base station.

The controller-802 may include, as a subset of its functions, some functions such as scheduling of the reference signals, configuring time-frequency resources on the sidelink interface for the RSU or for connected UEs and obtaining reports from a UE. A memory block-805, containing, for example, RAM and non-volatile memory (FLASH or ROM) is used by the central control unit-802. Alternatively, the RSU or the RSU-DU may be implemented based on FIG. 7.

UE Block Diagram

FIG. 9 shows a UE block diagram, according to an embodiment of the invention. A central radio control block, including the functions related to the PHY control and MAC layers of the V2X sidelink interface, is located within a central control unit-902, which may also perform other high-layer user services, including, for example, running applications.

The user interfaces, such as the display, speaker, and microphone, are located in an optional user interface block-901.

A memory block-907, containing, for example, RAM and non-volatile memory (FLASH or ROM) is used by the central control unit-902 and depending on the actual UE implementation, may be used also by the user interfaces-901.

Digital signal processing is performed by a signal processing block-903 which can provide modulated signals to the radios using TDD or FDD or packet bursts for communication, such as radios-904, for the sidelink operation in licensed and un-licensed bands, and eventually also to other radios-906, such as WiFi and Bluetooth, operating in license-exempt bands. Antennas-905 can be used for receive (RX) and transmit (TX), while using, for example, diplexers or switches.

Computing Platform

A computing platform, according to one embodiment of the invention, is schematically illustrated in FIG. 10. The computing platform-1001 consists of one or more processors-1002, non-volatile memory-1003, volatile memory-1005 and a network communication interface-1004. An application, program or process according to embodiments of the invention may run over an operating system installed in the computing platform 1001.

The computing resources of a computing platform can be dynamically allocated to one or more virtual machines, such that each virtual machine can use a number of processor cycles and a partition of the volatile and non-volatile memory. The system controller-1006 may run over a processor or a processor or a virtual machine.

Technologies

The description of this inventions uses terminology currently available for the 5G-NR technology. It shouldn't be considered that the invention is limited to this deployment mode, i.e. the sub-layers included in an RSU-DU may be included in a virtualized RSU or in a non-virtualized RSU and the description is also pertinent to these deployment options.

The RSU-CU can be virtualized on the same platform with the gNB-CU, such that the deployment of RSU-CU does not preclude to have it as part of gNB-CU, with or without UP-CP separation.

XS or E6 interface functionality can belong to an interface dedicated to RSU or can be integrated in the existing F1 respectively E1 interface.

The deployment can use the LTE technology, such that eNB corresponds to gNB, X2 interface corresponds to Xn interface, MME corresponds to AMF, S-GW corresponds to UPF.

As will be appreciated by those skilled in the art, the terminology used throughout the specification is mainly that which is associated with LTE and 5G standards. However, it should be understood that embodiments of the present invention encompass other cellular technologies as the RSU using DSRC or IEEE 802.11 technology and its associated stations.

RSU using IEEE 802.11 technologies can be controlled at layer 3 by an F 1/FS/Xn/Xns protocol while using IEEE 802.11 air protocol at layer 1 and layer 2.

Both TDD and FDD duplexing modes can be used as well as un-licensed and licensed frequency bands.

The examples provided show certain ways of carrying out the invention. It is to be understood that invention is not intended to be limited to the examples disclosed herein. Rather, the invention extends to all functionally equivalent structures, methods and uses, as are within the scope of the claims.

List of Abbreviations

5GC 5G Core
5QI 5G QoS Identifier
A/D Analog to Digital
AM Acknowledged Mode
AMF Access and Mobility Management Function
BWP BandWidthPart
CN Core Network
CP Control Plane
CU Central Unit
CSI Channel State Information
D2D Device to Device
D/A Digital to Analog
DCI Downlink Control Information
DL-SCH Downlink Shared Channel
DMRS Demodulation Reference Signal
DU Distributed Unit
E1 Interface between gNB-CU-CP and gNB-CU-UP
E6 Interface between RSU-CU-CP and RSU-CU-UP
eNB evolved Node B
F1-U F1 User plane interface
F1-C F1 Control plane interface
F1AP F1 Application Protocol
FDD Frequency Division Duplex
FFT Discrete Fourier Transform
FS Interface between RSU-CU and RSU-DU
gNB new generation Node B
GTP GPRS Tunneling Protocol
HARQ Hybrid Automatic Repeat Request
IE Information Element
ID Identifier
IP Internet Protocol ISO International Organization for Standardization
LTE Long Term Evolution
MAC Medium Access Control
MIB Master Information Block
MEC Mobile Edge Computing
MME Mobility Management Entity
NAS Non-Access Stratum
NR New Radio (aka 5G)
OAM Operation and Maintenance
PDCP Packet Data Convergence Protocol
PDU Packet Data Unit
PHY Physical
PLMN Public Land Mobile Network
PRB Physical Resource Block
QoS Quality of Service
RF Radio Frequency
RLC Radio Link Control
RNTI Radio Network Temporary Identifier
RRC Radio Resource Control
RRH Remote Radio Head
RS Reference Signal
RSRP Reference Signal Received Power
RSRQ Reference Signal Received Quality
RSU Road Side Unit
SD Slice Differentiator
SDAP Service Data Adaptation Protocol
SIB System Information Block
SINR Signal to Interference and Noise Ratio
SL Sidelink
SMF Session Management Function
S-NSSAI Single Network Slice Selection Assistance Information
SPS Semi-Persistent Scheduling
SR Scheduling Request
SRS Sounding Reference Signal
SS Synchronization Signal
SSB SS/PBCH block
TB Transport Block
TM Transparent Mode
UM Un-acknowledged Mode
UP User Plane
UPF User Plane Function
USIM Universal Subscriber Identity Module
V2X Vehicle to Everything
Xn-U Xn-User plane
XnAP Xn Application Protocol
Xns Interface between gNB and RSU

The invention claimed is:

1. A method for radio network operation, including:
providing a Radio Access Network (RAN) node, comprising a Central Unit (CU) and at least one Distributed Unit (DU), implementing at least one air interface for delivering communications between the RAN node and at least one User Equipment (UE);
executing, by the at least one DU, at least a MAC (Medium Access Control) sublayer;
disaggregating the CU into a CU-CP (CU-Control Plane) entity, executing at least an RRC (Radio Resource Control Protocol) layer, and into at least one first CU-UP (CU-User Plane) entity and at least one second CU-UP entity;
connecting the CU-CP entity and the at least one first CU-UP entity to a core network;
connecting the at least one second CU-UP entity to the CU-CP entity and to the at least one DU, through respective logical interfaces; and
forwarding user data associated with a specific application, without passing through any core network entity or function, between the specific application executed by one or more UEs and a specific application server hosted by a Mobile Edge Computing (MEC) platform, via at least one serving DU of the one or more UEs and via a given second CU-UP entity located or not on the MEC platform.

2. The method according to claim 1, wherein the RAN node is a base station or an RSU (Road Side Unit) or a combined base station and RSU.

3. The method according to claim 1, wherein the at least one second CU-UP entity executes at least one of: a PDCP (Packet Data Convergence Protocol) sublayer or a SDAP (Service Data Adaptation Protocol) sublayer, the PDCP sublayer being adapted for executing a cellular base-station-to-device air interface or a cellular device-to-device air interface.

4. The method according to claim 1, wherein the specific application executed by the one or more UEs can communicate through the at least one serving DU with at least one of: an application server, different from the specific application server, situated in Internet or the specific application server hosted by the MEC platform.

5. The method according to claim 4, wherein the at least one serving DU forwards user data associated with the specific application executed by the one or more UEs to the given second CU-UP entity connected to the specific application server hosted by the MEC platform.

6. The method according to claim 1, wherein messages of the specific application executed by the one or more UEs are encapsulated by a local router while using a tunneling protocol and transmitted through the given second CU-UP entity to the MEC platform or to the specific application server hosted by the MEC platform.

7. The method according to claim 6, wherein the MEC platform is determined based on at least one item from the list of: existence on the platform of the specific application server, a location information pertinent to a UE or to a radio head or a business code indicating whether the UE has access to the MEC platform.

8. The method according to claim 7, wherein the business code is specific to a provided service or specific to a contracting entity.

9. The method according to claim 7, wherein the business code is included in the Slice Differentiator (SD) field of a S-NSSAI (Single Network Slice Selection Information) identifier.

10. The method according to claim 1, wherein a current IP address or a current Layer 2 address of the specific application server or of the MEC platform is replaced with the IP address or the Layer 2 address of another specific application server or of another MEC platform hosting the new specific application server.

11. The method according to claim 10, wherein is added an adaptation or routing layer on top of PDCP or on top of SDAP sublayers for executing the replacement of the IP Address or the replacement of the Layer 2 address.

12. The method according to claim 11, wherein the functionality of the SDAP layer is enhanced for executing the replacement of the IP address or the replacement of the Layer 2 address.

13. The method according to claim 1, wherein the specific application is identified by an application identifier (ID).

14. The method according to claim 13, wherein the application ID is included in the Slice Differentiator (SD) field of the S-NSSAI.

15. The method according to claim 1, wherein one or more Layer 2 or Layer 3 addresses of the of the one or more UEs are indicative of the user data forwarding to at least one of: the core network or the MEC platform.

16. The method according to claim 1, wherein the at least one DU executes also the PDCP sublayer.

17. The method according to claim 1, wherein the air interface is at least one of: the cellular base-station-to-device air interface or the cellular device-to-device air interface.

18. A Radio Access Network (RAN) node, implementing at least one air interface for delivering radio communications between the RAN node and at least one User Equipment (UE), comprising:
   at least one Distributed Unit (DU) configured to execute at least a MAC (Medium Access Control) sublayer; and
   a Central Unit (CU), which is disaggregated into a CU-CP (CU-Control Plane) entity, configured to execute at least an RRC (Radio Resource Control Protocol) layer, and into at least one first CU-UP (CU-User Plane) entity and at least one second CU-UP entity,
   wherein both the CU-CP entity and the at least one first CU-UP entity are configured to connect to a core network, and
   wherein the at least one second CU-UP entity is configured to connect to the CU-CP entity and to the at least one DU through respective logical interfaces, and
   wherein user data associated with a specific application is forwarded, without passing through any core network entity or function, between the specific application executed by one or more UEs and a specific application server hosted by a Mobile Edge Computing (MEC) platform, via at least one serving DU of the one or more UEs and via a given second CU-UP entity located or not on the MEC platform.

19. A RAN node according to claim 18, wherein the air interface used by the one or more UEs for communicating the user data associated with the specific application to the RAN node is at least one of: a cellular base-station-to-device air interface or a cellular device-to-device air interface.

20. A Mobile Edge Computing (MEC) platform hosting a specific application server of a specific application executed by one or more User Equipments (UEs) connected to a Radio Access Network (RAN) node, wherein the RAN node implements at least one air interface for delivering communications between the RAN node and at least one UE, the RAN node comprising a Central Unit (CU) and at least one Distributed Unit (DU) serving the at least one UE and wherein the at least one DU executes at least a MAC (Medium Access Control) sublayer and wherein the CU is disaggregated into a CU-CP (CU-Control Plane) entity, executing at least an RRC (Radio Resource Control Protocol) layer, and into at least one first CU-UP (CU-User Plane) entity and at least one second CU-UP entity, wherein a given second CU-UP entity is incorporated within the MEC platform, and wherein the CU-CP entity and the at least one first CU-UP entity are connected to a core network and wherein the at least one second CU-UP entity is connected to the CU-CP entity and to the at least one DU, through respective logical interfaces, the MEC platform comprising:
   at least one network interface;
   a memory; and
   at least one processor, which is configured to:
   connect the given second CU-UP entity to the specific application server hosted by the MEC platform,
   connect, through a respective logical interface, the given second CU-UP entity to the at least one serving DU of one or more UEs configured to execute the specific application,
   forward, through the given second CU-UP entity, user data, associated with the specific application, between the specific application executed by the one or more UEs and the specific application server hosted by the MEC platform, without passing through any core network entity or function.

* * * * *